Dec. 10, 1968 S. L. RICHMAN 3,415,690
NORMALLY SEALED VENTED METAL ENCASED RECHARGEABLE CELL
WITH EXCESS PRESSURE VENT RELEASE
Filed June 28, 1967 2 Sheets-Sheet 1
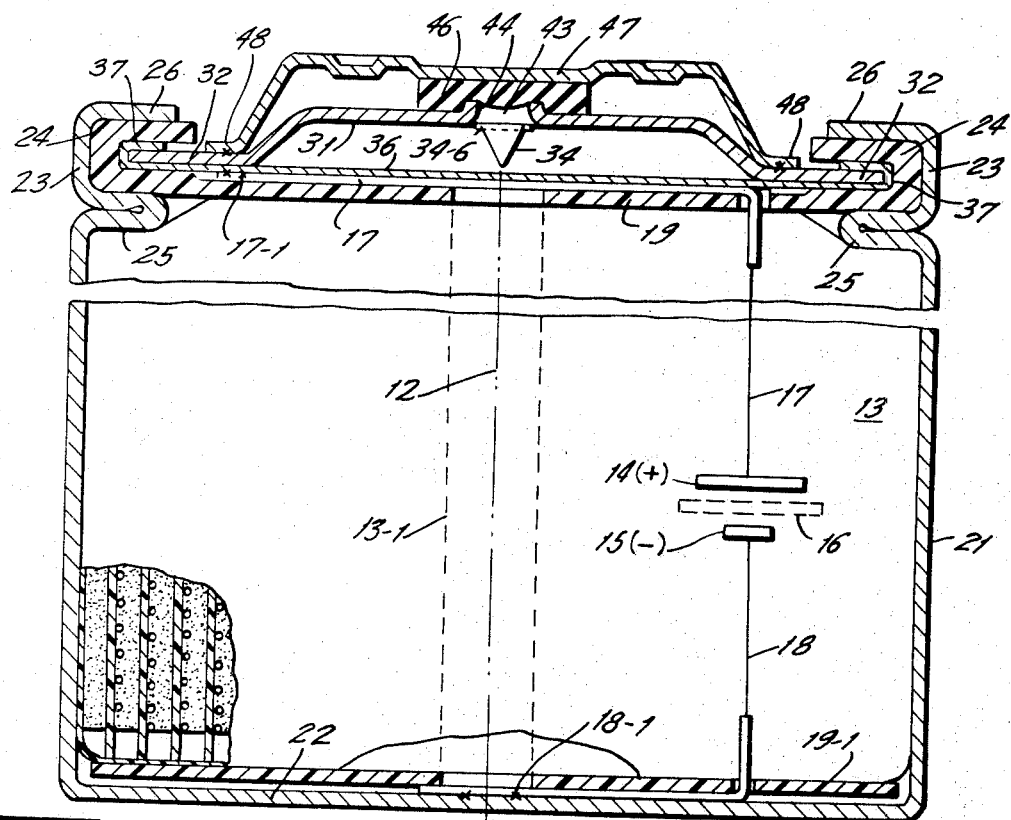
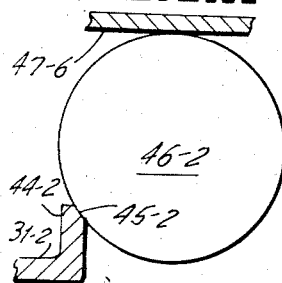
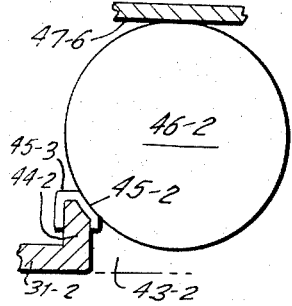
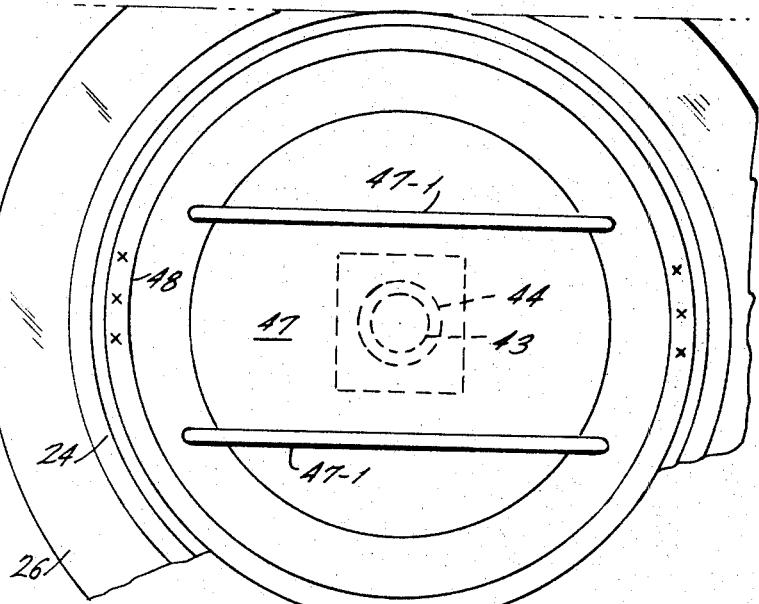

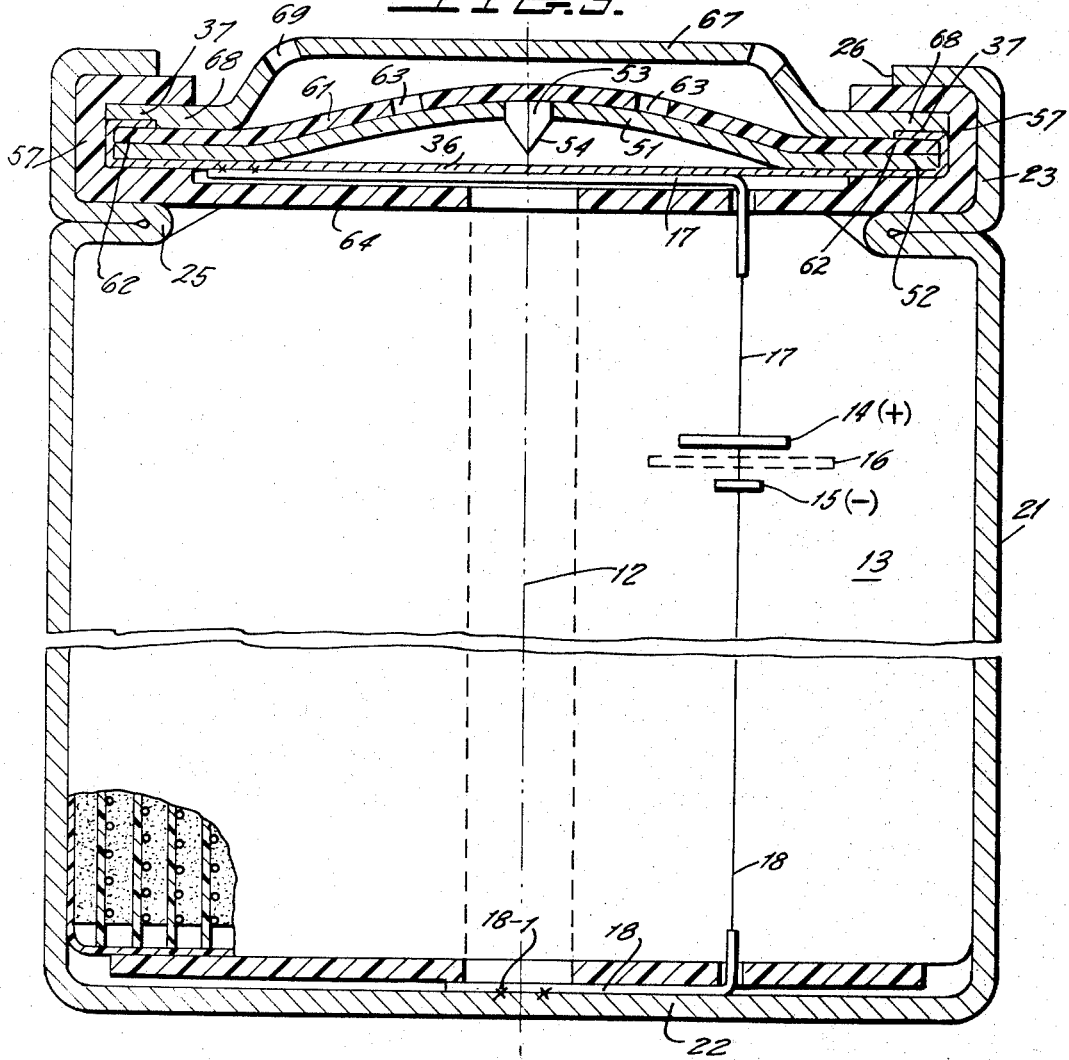
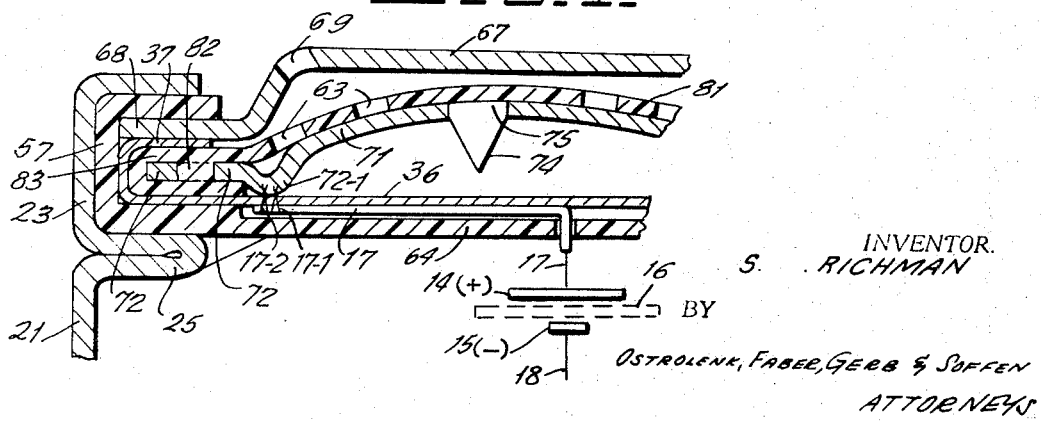

United States Patent Office 3,415,690
Patented Dec. 10, 1968

3,415,690
NORMALLY SEALED VENTED METAL ENCASED RECHARGEABLE CELL WITH EXCESS PRESSURE VENT RELEASE
Samuel L. Richman, White Plains, N.Y., assignor to Sonotone Corporation, Elmsford, N.Y., a corporation of New York
Continuation-in-part of application Ser. No. 476,063, July 30, 1965. This application June 28, 1967, Ser. No. 657,456
8 Claims. (Cl. 136—178)

ABSTRACT OF THE DISCLOSURE

A casing wall of a sealed metallic casing which encloses a rechargeable battery cell has a vent opening normally sealed by a compressed valve body set to release internal gases of a predetermined excess pressure.

---

This application is a continuation-in-part of application Ser. No. 476,063 filed July 30, 1965, now abandoned.

This invention relates to sealed rechargeable batteries operating with alkaline electrolyte and developing excess internal gas pressure during charging. Specifically, the invention relates to such nickel-cadmium cells, although in its broad aspects the invention is of value in other types of rechargeable cells. However, practical exemplifications of the invention will be described in connection with sealed nickel-cadmium battery cells.

As protection against damage by rupture of the cell casing under developed excessive internal gas pressure, nickel-cadmium cells have been sealed with a thin flexible diaphragm which is punctured or ruptured under predetermined excessive internal pressure by an overlying casing projection or tooth. U.S. Patents 3,262,819, 2,922,-833 and 2,862,641 describe sealed cells protected with such rupturable diaphragm.

Once the thin diaphragm of such sealed cell is ruptured by internal gas pressure, each subsequent charging operation converts some of the cell electrolyte into vapor or gas, part of which escapes through the ruptured diaphragm into the exterior space. Such increasing loss of electrolyte by successive charging operations and also by evaporation in standby condition gradually reduces the charging capacity of the cell until it has to be discarded and replaced by a new cell.

Among the objects of the invention are sealed rechargeable cells of the foregoing type which will suppress loss of cell electrolyte after rupture of its protective diaphragm by excessive internal pressure.

In accordance with the invention, the casing part of such cell adjoining the exterior surface with its rupturable diaphragm is provided with a vent opening which is positively sealed against escape of gas or vapor and prevents their escape through the ruptured diaphragm to the exterior space.

The foregoing and other objects of the invention will be best understood from the following description and exemplifications thereof by reference to the drawings wherein:

FIGURE 1 is a vertical cross-sectional and partially diagrammatic view of one example of a sealed cell of the invention;

FIGURES 1-A and 1-B are views similar to FIG. 1, showing modified vent-valve arrangements for a sealed cell of the type shown in FIG. 1;

FIGURE 2 is a top view of the cell seen in FIG. 1;

FIGURES 3 and 4 are cross-sectional views similar to FIG. 1, respectively showing modified forms of a cell of the invention.

Although the invention is applicable to other types of rechargeable battery cells, it has been evolved and is of special value in connection with rechargeable cells of the nickel-cadmium type. Accordingly, the principles of the invention will be herein described in connection with nickel-cadmium battery cells.

Most rechargeable sealed nickel-cadmium battery cells are made with sintered nickel-powder electrode plates containing in their pores the respective active electrode material. However, such sealed cells may also operate with pocket-type electrodes as described, for example, in U.S. Patent 3,022,363 of P. F. Grieger. In all nickel-cadmium rechargeable cells, the discharged positive electrode mass consists of nickel (II) hydroxide—$Ni(OH)_2$—which when fully charged is converted into nickel (III) hydroxide—$NiO(OH)$—having nickel in a higher oxidation state. The discharged negative electrode mass of such cell consists of cadmium (II) hydroxide—$Cd(OH)_2$—which when fully charged is converted into metallic cadmium.

As disclosed, for example, in U.S. 2,131,592 of Lange et al. and British Patent 317,130 (1929) of V. Harold, the negative electrode of nickel-cadmium cell should have more capacity than the positive for causing all oxygen developed during charging to be absorbed by the negative electrode.

The quality of a sealed nickel-cadmium rechargeable cell is determined by its ability to be repeatedly charged and to retain the same charge and charge characteristics for a long useful life in a great many charge and discharge cycles. With normal quality controls applied to the manufacture of sealed nickel-cadmium batteries, some of the cells may develop excess internal pressure while being charged. Such excessive internal pressure developed in the sealed cell may cause bulging of the strong metallic cell casing, and may also cause dangerous bursting of the cell casing.

To meet this problem, such sealed cells have been provided with a puncturable thin metallic diaphragm as described, for example, in U.S. Patents 3,262,819 of L. Belove and 3,062,910 of R. L. Schenk, Jr. Once the thin puncturable diaphragm of such sealed cell is ruptured, subsequent charging operations will convert some of the cell electrolyte content into vapor or gas part of which escapes through the ruptured diaphragm into the exterior space. As a result, a cell with a ruptured sealing diaphragm keeps losing electrolyte in successive charging operations and also by evaporation. Such loss of electrolyte reduces the charging capacity of the cell until it becomes useless or low, although its electrode assembly retains its full usefulness for a long period except for the lack of electrolyte.

In accordance with the invention, the casing part of a sealed nickel cadmium cell adjoining the exterior surface of its puncturable or rupturable diaphragm is provided a vent opening which is normally closed and keeps sealed the interior of the cell casing and prevents escape of electrolyte vapor or gases even if its thin rupturable diaphragm has been broken by excessive internal gas pressure. The normally closed vent opening is arranged to permit its valve means to open the vent and release gas only in response to the internal gas pressure reaching a predetermined raised level beyond which the casing would be bulging or cause the bursting of the casing.

FIGS. 1 and 2 show one form of a sealed rechargeable battery cell exempifying the invention. It comprises an electrode assembly 13 which may consist of one or more pairs of superposed positive electrode plates 14(+) and negative electrode plates 15(—) with an interposed porous insulating separator 16. The electrode assembly has its pores impregnated with alkaline electrolyte. The cell shown has only one pair of superposed electrode plates 14(+), 15(—) with an interposed separator 16 coiled along a common central axis 12 into an electrode assembly 13 fitting or engaging with its exterior surface surrounding tubular casing 21. The electrode assembly and cell may be similar to that described in U.S. Patent No. 3,262,819 of L. Belove.

The tubular casing 21 has a bottom wall 22 and an upper open end surrounded by a generally tubular casing junction region 23. Within the upper casing junction region 23 is held a metallic cover wall 31 having a rim 32 which is joined by an electrically insulating seal 24 to the surrounding casing junction region 23. The insulating seal 24 is shown formed by a relatively thick collar 24 of insulating material, for example, a gas-tight nylon, which is held compressed by the surrounding casing junction 23 against the adjoining edge and opposite rim surfaces of cover rim 32. The casing junction 23 has an inward casing shoulder 25 and an outer casing edge region 26 which compress the overlapping side walls of insulating collar 24 against the opposite rim surfaces of cover rim 32 to provide a gas-tight insulating seal between them.

The casing 21 and cover wall 31 are formed of strong gas-tight metal such as rolled gas-tight steel sheet material coated with an alkaline-resistant coating such as a thin nickel plating. A thin rupturable gas-tight metallic diaphragm 36 extends and overlaps the entire inwardly facing surface of cover wall 31 and also its rim 32. The gas-tight rupturable diaphragm 36 has a rim region 37 overlapping and surrounding the edge and adjoining rim surfaces of cover rim 32 so that when the plastic insulating collar 24, of nylon, for instance, is compressed by the junction region 23 the overlapping rim portions 37 of the thin gas tight diaphragm will be tightly clamped against the embraced edge and rim surfaces of cover rim 32 and positively establish and maintain a gas tight insulating seal between the cover rim and the surrounding casing junction region 23 and their interposed plastic insulating collar 24.

The central portion of cover wall 31 has an inwardly extending metallic puncture projection 34 of tooth-shape, for instance, with its pointed end held immediately adjacent the underlying portion of flexible diaphragm 36 so that it is punctured when it is flexed upwardly by excessive internal casing gas pressure for releasing the excess pressure gases. In the form shown, puncture projection 34 has mounting tail portion 34–6 which is secured, as by electric welds, to the overlying metal cover 31.

As one example, good results are obtained with a thin rupturable diaphragm 36 made of a suitable gas-tight alkaline metal such as nickel or nickel-plated steel. For example, in the case of a cell having dimensions of a D-type cell, good results are obtained with a steel cover 31 of 0.028 inch thickness and a rupturable thin diaphragm 32 of 0.002 inch thickness.

The coiled electrode assembly 13 may be wrapped in a film of insulating material which insulates it from surrounding metallic casing 31. The positive and negative cell electrode plates 14(+) and 15(−) are connected by flexible metallic connector tabs 17 and 18, respectively, to exposed metallic casing terminals. The electrode tab 17 from the positive electrode 14 passes through a slit in an upper insulating sheet 19 and has the end of its tab 17 connected by welds 17–1 to the overlying portions of metal cover 31 and the overlapping portion of rupturable metal diaphragm 36. The negative electrode tab 18 passes through a slit of a similar bottom insulating sheet 19–1 and its tab end is joined by electrode welds 18–1 to underlying central portion of metallic casing bottom 22. The electrode assembly 13 has an axially extending central passage 13–1 of sufficient width to permit insertion through its upper open end of elongated welding electrode against bottom casing wall 22 for forming the tab welds 18–1.

In accordance with the invention, to protect a rechargeable cell of the type described above against continuous progressive deterioration through loss of electrolyte after diaphragm rupture by excessive internal pressure developed, the cell casing is provided with a normally closed vent opening which normally prevents escape of gas or vapor through the ruptured diaphragm, but permits escape of gases in response to a predetermined rise of internal gas pressure, for example, above 180 p.s.i. (pounds per square inch).

FIG. 1 shows one cell exemplifying the invention. The intermediate or central portion of cover wall 31 has a vent opening 43 bounded by rim 44.

The vent opening 43 is normally closed by valve member 46 which is held pressed against the vent opening rim 44 by an overlying metallic terminal wall 47. In the form shown, the valve member 46 is formed of a gas-tight elastically yieldable organic polymer body which resists corrosion by alkaline electrolyte of such cells. As examples, they include elastomers, such as neoprene butyl rubber and alkaline resistant fluorocarbon polymers, such as polytetrafluoroethylene (abbreviated as "TFE"), copolymers of tetrafluoroethylene and hexafluoropropylene (abbreviated as "FPE") and other alkaline resistant polymers described, for instance, in the Modern Plastic Encyclopedia, 1963 issue and subsequent issues.

The intermediate wall portion of casing terminal wall 47 constitutes a compressing beam which is separated by two longitudinal slits 47–1 from the side wall regions thereof for enabling independent dimensioning, shaping and elastically deforming this terminal wall beam 47 to apply predetermined sealing forces which compress the valve member 46 with a predetermined sealing pressure against the engaged sealing surface of vent opening rim 44 of cell casing vent wall 31. The elastically deformed casing wall portion 47 engaging the valve member 46 has a central inwardly deformed wall region and is properly chosen and dimensioned in order to cause its elastic deformation to provide the predetermined pressure forces with which it compresses the movable valve member 46 against the sealing surface of vent opening rim 44.

The metallic terminal wall 47 is metallically connected to positive cell terminal tab 17. This terminal connection is established through the electric weld connections 48–1 between metallic terminal wall rim 48 and the underlying metallic cover wall 31, the rim 32 of which is connected by electric weld to the underlying tab end of positive cell tab 17 as described above.

A thin coating of alkali-resistant gas-tight plastic or resinous material may be applied to the edge portions of vent opening rim 44 which is in pressure sealing engagement with the valve member 46 for deforming such plastic edge coating by the applied sealing pressure of valve member 46 and establish a gas-tight sealing engagement therebetween. For example, good results are obtained by coating the sealing surfaces of the vent opening rim 44 with an adhering thin layer of gas-tight alkali-resistant plastic material, such as the above identified fluorocarbon polymers Other gas-tight alkali-resistant resins may be used for such adhering plastic sealing layers, for example, the heat and chemically resistant special styrene polymers, also such vinylchloride and vinylchloride-acetate polymers described, for instance, in Modern Plastic Encyclopedia, 1965 and 1965 issues.

FIG. 1–A shows another form of vent valve arrangement for such cell. A vent cover wall 31–2 has a similar vent opening 43–2 with a vent rim 44–2. The upper edge of vent rim 44–2 has an inwardly tapering surface 45–2 shaped for engagement with a metallic valve ball 46–2 which is pressed into sealing engagement therewith by terminal wall 47–6 which is otherwise similar to terminal wall 47 of FIGS. 1 and 2. Such a hermetic seal is described in the NASA Tech Brief, published February 1965, by the Clearing House for Scientific and Technical Information, Springfield, Va., 22251 with further information obtainable from Technology Utilization Officer, Jet Propulsion Laboratory, 4800 Oak Grove Drive, Pasadena, Calif., 91103. Reference B65–10040.

FIG. 1-B shows a modification of the valve arrangement of FIG. 1-A, wherein the upper rim surface 45-2 has secured thereto a thin layer of alkali-resisting plastic, such as the fluorocarbon and other resins identified above.

If while charging the cell of FIGS. 1 and 2 (or of FIGS. 1-A, 1-B), excessive internal pressure above a predetermined level is developed within the cell casing, for instance exceeding 180 p.s.i., its thin metal diaphragm 35 is deflected and ruptured by the overlying cover tooth 34. The so ruptured diaphragm 36 permits excess gases to escape in the space underlying metallic cover 31 with its closed vent opening 43. If the excess internal pressure remains above the predetermined maximum level, for example above 180 p.s.i., the compressed gases will keep the valve member 46 lifted from its sealing engagement with the vent opening rim 44 and permit the excess pressure gases to escape into the exterior through the vent slits 47-1 of the outer metallic terminal wall 47. After escape of the excess pressure gases reduces the internal pressure to a predetermined level, for example to 180 p.s.i., the elastic restoring forces of the metallic terminal wall 47 return and compress the valve member 46 with the predetermined pressure forces into sealing engagement with the vent opening rim 44 of cover wall 31 and restore it to the normal gas-tight sealing condition. In the so reestablished sealed condition of the vent wall opening 43, gases developed in the cell casing 21 will be free to pass into the space above the now ruptured metal diaphragm 36 underlying the vent cover wall 31 and its sealed vent opening 43. If in a subsequent charging operation a predetermined excess internal gas pressure is developed, for example above 180 p.s.i., they will again lift valve member 46 from its sealing engagement with its vent opening rim 44 for releasing excess pressure gases. The valve member 46 will return to the sealed condition when the internal gas pressure has been lowered to the predetermined upper level.

Referring to the modifications of FIGURES 1-A and 1-B, the valve ball 46-2, for example, may be formed of metal, such as steel, having an exterior nickel plating. Further, the outer spherical surface of ball 46-2 or its tapered seat 45-2 may be coated with a suitable alkaline resistant polymer substance to prevent seizing therebetween.

FIG. 3 shows another example of a sealed cell of the invention having excess-pressure-release rupturable diaphragm combined with a cover having a normally closed vent valve which releases predetermined excess internal gas pressure after rupture of its diaphragm. The cell has an electrode assembly 13, which may be identical to that of FIG. 1, held within a sealed casing having a tubular metallic casing 21 with a similar casing junction 23 at its open end. A cover wall 51 with a similar intermediate or central vent opening 53 has a puncture tooth 54. The cover wall 51 with its rim 52 are overlapped in a similar way by a similar rupturable diaphragm 36 and its diaphragm rim 37. An insulating collar 57 (similar to insulating collar 24 of FIG. 1) is held compressed by the surrounding casing junction wall 23 against the edge and opposite rim surfaces of cover wall rim 52 and the overlapping diaphragm rim portions 37 of its rupturable diaphragm 36. In accordance with the invention claimed in copending application Ser. No. 479,081, filed Aug. 12, 1965, now abandoned, the cover wall 51 is deformed to give it an outwardly convex curved shape, and its vent opening 53 is normally sealed by an overlying stretched sealing sheet 61 of gas-tight and alkali-resistant strong organic polymer such as the fluorocarbon resin material, for example, polytetrafluoroethylene, described above.

The rim 62 of the polymer sealing sheet 61 is affixed to the facing cover wall rim 52.

As shown, except for its flat rim 52, the major area of the metallic cover 51 is deformed into an upwardly facing convex cover structure holding radially stretched thereon the overlying main region of its polymer sealing sheet 61. The intermediate or central portion of the sealing sheet 61 is held elastically stretched in tight sealing engagement with the underlying main convex surface of metal cover 51 surrounding its central vent opening 53. Radially spaced from the intermediate or central portion of sealing sheet 51 overlying the cover vent opening 53, the radially stretched polymer cover sheet 51 has one or a plurality of arcuately spaced vent openings 63 which are held normally sealed by the underlying strong convex portions of metal cover 51 against which the polymer sealing sheet 61 is held in stretched sealing engagement therewith.

The combination of the convex shaped vented metallic cover wall 51 with its complementary stretched polymer sealing sheet 61 secured to the metal cover rim 52 is formed while the entire area of the metal cover 51 and the plastic sealing sheet 61 and their rims 52, 62 are still in flat planar condition. This makes it possible to affix the rim 62 of the still unstretched plastic sheet 61 to the underlying of metal cover rim 52 while they are both in flat condition. After so affixing the unstretched plastic sheet rim 62 to the underlying metallic cover rim 52, the composite flat metal cover and plastic sheet assembly are subjected to the deforming operation in which their main central region is deformed outwardly into the convex shape shown in FIG. 3 in which the overlying polymer sealing sheet 61 is radially elastically stretched for establishing tight and positive sealing engagement thereof with the central metal cover vent opening 53 and for also sealing the radially displaced plastic sheet vent openings 63 of polymer sealing sheet 61 against the underlying solid surface of convex metal cover wall 51. The rupture tooth 54 and its vent opening 53 are formed in a metal cover 51 while still in the flat condition and before the plastic sheet rim 62 has been affixed to metal cover rim 52.

The thick insulating collar 57 of suitable gas-tight polymer substance, such as nylon, is held compressed in sealing engagement with the overlapped rim edge region of the inner metallic cover rim 52 and its affixed polymer sealing sheet rim 62 and also against the adjoining rim surfaces of the superposed metallic cover rim 52 to provide between them gas-tight insulating seals with the surrounding tubular metallic casing region 23. The raised portion of metallic terminal wall 67 has one or a plurality of vent openings 69 for passing excess pressure gases expelled from the casing interior through the opened coverwall vent opening 53.

Insulating collar 57 may have integrally formed therewith the upper insulating separator layer or sheet 64 corresponding to the upper insulating sheet 19 of the cell of FIG. 1. Otherwise, the cell of FIG. 5 may be identical with that of FIGS. 1 and 2.

If during charging predetermined excess internal pressure, for example 180 p.s.i., develops in the cell of FIG. 3, the rupturable diaphragm 36 will be outwardly deformed and ruptured by overlying metal cover tooth 54 for discharging the excess pressure gases into its underlying space. If the internal gas pressure remains above the predetermined upper level, for example above 180 p.s.i., the compressed gases acting through metallic cover vent opening 53 on the overlying sealing portion of stretched sealing sheet 61 and the central portion of sealing sheet 61 will be lifted from its sealing engagement with the cover wall vent opening 53 and will also open its normally sealed vent openings 63 and cause the compressed gases to escape therethrough into the overlying space from which they escape through one or more vent openings 69 of outer metallic terminal wall 67.

Although fluorocarbon resin bodies are known for their unique anti-stick properties, selected areas of such fluorocarbon bodies may be treated along their junction surfaces for securing strong cemented junctions between such treated fluorocarbon body junction surfaces, as with epoxy cement, to metallic or other structures to which they are to be affixed. Such treatments of junction surfaces of fluorocarbon bodies and the affixing of their so treated surfaces, as by epoxy adhesives, to surfaces of metallic, ceramic and plastic structures is well known in the art. Reference is made to the following publications describing bonding of fluorocarbon bodies to structural materials:

Adhesive Age, August 1962, 5, p. 3, article "Methods of Bonding Fluorocarbon Plastic to Structural Materials" by M. C. St. Cyr.

Product Engineering, September 1962, 33, p. 72, article "For High Pressures, A New Seal" by A. W. Ziegler.

An example of a process for affixing the surfaces of the rim 62 of a polytetrafluoroethylene plastic sheet 61 to the facing metal cover rim 52 will now be described. The circular fluorocarbon sheet 61 has all its exposed surfaces—except its bonded rim surface 62—coated with a protective adhering paraffin coating layer. The so differentially coated sheet 61 or at least its uncoated rim surface 62 is exposed for two minutes to etching or treatment with a dispersion of sodium naphthalene available under the trade name Tetra-Etch (MS–20,425) which dispersion is slightly agitated during the treatment. After the etching treatment, the plastic sheet is immersed in fresh water for thirty seconds followed by rinsing with hot running water for three minutes. The so treated and rinsed plastic sheet is then rinsed with denatured alcohol followed by drying and removing the paraffine coating. Thereafter the treated sheet 61 is placed in metal cover 51 with the treated sheet rim surface 62 facing the cover rim 52 and the two aligned facing rim surfaces are affixed or bonded to each other with alkali-resistant epoxy adhesives. Suitable alkali-resistant epoxy-resin adhesives for forming gas-tight bonds are described in "Epoxy Resins" by H. Lee and K. Neville, Copyright 1957 by McGraw Hill Book Company and "Epoxy Resins" by I. Skeist, Copyright 1958 by Reinhold Publishing Corporation. Table 11–2 of the Skeist book gives data on alkali-resistant epoxy resin adhesives. Also in Modern Plastics Encyclopedia, issue of 1965, pages 179–184 and the references given therein.

The cell of FIG. 4 is similar to that of FIG. 3 except for the modifications described below.

Cover wall 71 has punctured tooth 74 and vent opening 75 corresponds to cover wall 51 of FIG. 3. Polymer sealing sheet 81 (corresponds to sealing sheet 61 of FIG. 3) has rim sections 83 which overlap and are affixed to cover rim 72 for holding the sealing sheet 81 in stretched sealing engagement with large central convex surface of cover wall 71 and provide analagous ventable cover seals. Alternatively, metal cover rim 72 may be coextensive with the rim 68 of the outer terminal wall and both the upper and lower plastic rim sections 83 of sheet 81 are secured to each other and to the upper and lower rim surface of cover rim 72 by the plastic junction portions filling the openings 82 of the cover wall rim 72 and also with cement to the underlying metal rim surfaces of cover 71. The flexible diaphragm 36 overlaps with its rim 37 the two plastic rim sections 83 and the metal cover rim 72 held therebetween. The metal cover 71 has a downwardly displaced wall portion 72–1 to which the end of the positive electrode tab 17 and intermediate portion of diaphragm 36 are affixed by electric welds 17–2 as in the cell of FIGS. 1 and 2.

Sealed rechargeable cells having a resealable vent opening formed on an outwardly-convex end wall of the type shown and described in connection with FIGURES 3 and 4 are claimed in the copending application Ser. No. 649,-570 filed June 28, 1967 as a continuation-in-part of application Ser. No. 479,081 filed Aug. 12, 1965, both assigned to the assignee of the present application.

In describing above the best mode for making metal encased rechargeable cells exemplifying the invention, it was stated that the leak-proof insulating collar junction between the rim edge region of the metallic casing cover wall and the surrounding tubular metallic casing portion was formed of a compressed polyamide plastic known as nylon, such as described in the Textbook of Polymer Science by F. W. Billmeyer, Jr., Copyright 1962, pp. 429–432.

It was found that the compressed nylon insulating collar seals lose their leak resistance when metal-encased cells having such nylon insulating seal are subjected to as few as one to five temperature changes or thermal shocks, for instance, between —40° C. and +65° C. In accordance with the inventions of application Ser. Nos. 649,569 and 649,570, both filed on June 28, 1967, the insulating collar seal of such metal encased sealed cells will remain leaktight even after a large number of heat shocks, such as at least fifty heat shocks between —40° C. and +65° C. by making the seal of an alkali-resistant synthetic elastomer substance. As an example, the insulating collar seal of such metal encased cell will remain leaktight after subjecting the cell casing to such large number of heat shocks provided its insulating collar seal is formed of an amorphous ethylene-propylene elastomer polymer. Leaktight insulating cell collar seals of greatest leak-proof stability under a large number of thermal shocks are secured by forming it of an amorphous elastomer terpolymer of ethylene, propylene and a small addition of a nonconjugated diene, such as known for some time past as EPT elastomer terpolymers and described in 1964 and 1965 publications of the Enjay Chemical Company, Cranford, N.J., U.S.A.

The principles of the invention described in connection with specific exemplifications suggest other modifications and applications and the appended claims shall not be limited thereto.

The embodiments of the invention in which an exclusive privilege or property is claimed are defined as follows:

1. In a sealed rechargeable battery cell:
an electrode assembly of at least two opposite-polarity electrodes and associated electrolyte which develop gas pressure when charged,
a sealed enclosure comprising a strong tubular metallic casing and a strong cover wall enclosing said assembly and connected to said two electrodes, respectively,
said cover wall having vent portions with a vent opening and an inwardly projecting pointed tooth and also a peripheral cover rim affixed with a gas-tight insulating seal to the surrounding tubular casing junction region near the open tubular casing end,
a thin flexible metallic diaphragm overlapping the entire interior surface and the rim region of said cover wall for flexure against and being punctured by said tooth by gas pressure within said enclosure,
said insulating seal comprising a continuous leak-proof insulating collar of organic polymer substance surrounding said cover rim and having inner and outer collar flanges overlapping and maintained compressed against the rim edge region of said cover rim and also the rim of said diaphragm overlapping said cover wall rim,
a movable closure valve body in gas-tight sealing engagement with vent wall portions of said vent wall defining said vent opening,
and pressure means for holding said closing body with predetermined pressure in said tight sealing engagement with said vent opening wall portion,
said pressure means being responsive to predetermined internal gas pressure on said closure body for releasing said valve body from said sealing engagement and releasing internal gases through said valve opening.

2. In a sealed rechargeable battery cell as claimed in claim 1;
said closure valve body having a spherical valve portion held by said pressure means in gas-tight sealing engagement with the portions of cover wall bordering said vent opening and thereby sealing said vent opening.

3. In a sealed rechargeable battery cell as claimed in claim 1;
the cover wall portions forming said vent opening including an outwardly tapered rim having interior surface portions with a shape conforming to the shape of engaged portions of said sperical valve portion for maintaining therewith said gas-tight sealing engagement.

4. In a sealed rechargeable cell as claimed in claim 1, said pressure means comprising an elastically deformable metallic sheet member overlying said cover wall and holding said closure body under pressure in said sealing engagement.

5. In a sealed rechargeable cell as claimed in claim 1, said pressure means comprising an elastically deformable metallic sheet member overlying said cover wall and holding said closure body under pressure in said sealing engagement;
said cover wall comprising a sheet of elastically deformable ductile metal having said vent opening.

6. In a sealed rechargeable battery cell as claimed in claim 1;
said movable closure body comprising a polymer sheet overlying said cover wall having an intermediate sheet portion movable from said sealing engagement to a gas releasing position, the rim of said polymer sheet being affixed to the rim of said cover wall and constituting said pressure means holding said sheet portion in said sealing engagement and responsive to said gas pressure for releasing the internal gases.

7. In a sealed rechargeable battery cell having two electrodes and associated electrolyte which develop gas pressure when charged,
a sealed enclosure comprising a strong tubular metallic casing and a strong cover wall enclosing said assembly and connected to said two electrodes, respectively,
said cover wall being formed of gas-tight elastic metal and having a vent opening and an inwardly projecting puncture tooth and also a cover rim affixed with a gas-tight insulating seal to the surrounding tubular casing junction region near the open tubular casing end,
a continuous leak-proof insulating collar of organic polymer substance surrounding and overlapping and sealingly compressed against the rim edge region of said cover wall rim,
a thin diaphragm member interposed between said cover wall and said electrode assembly and having a diaphragm rim sealed by said collar to the rim of said cover wall,
said puncture tooth causing puncturing of said diaphragm upon deflective movement thereof under pressure of predetermined limit exerted by gases within said sealed enclosure,
a movable gas-tight valve body having a spherical valve portion held in gas-tight sealing engagement with vent wall portions of said vent wall defining said vent opening,
and means for holding said valve body with predetermined pressure in said tight sealing engagement with said vent opening wall portion and responsive to predetermined excessive internal gas pressure for breaking its sealing engagement and releasing excess pressure gases through said vent opening,
the cover wall portions forming said vent opening being of ductile metal having the property of elastically yielding under pressure engagement with said valve body in the pressure range between 100 and 400 pounds per square inch sealing pressure applied to said valve body.

8. In a sealed rechargeable battery cell as claimed in claim 7;
said cover wall portions forming said vent opening including an outwardly tapered rim having an interior surface with a shape conforming to the shape of engaged portions of said spherical valve portion of said valve body.

References Cited

UNITED STATES PATENTS

| | | | |
|---|---|---|---|
| 2,601,133 | 6/1952 | Yardeny | 136—178.3 XR |
| 2,790,570 | 4/1957 | Hodges et al. | |
| 3,293,081 | 12/1966 | Daley | 136—178 |

WINSTON A. DOUGLAS, *Primary Examiner.*

D. L. WALTON, *Assistant Examiner.*

U.S. Cl. X.R.

136—133